E. G. DU MAZUEL.
MEANS FOR TRANSMITTING HIGH PRESSURE FLUIDS.
APPLICATION FILED MAY 6, 1919.

1,330,310. Patented Feb. 10, 1920.

Inventor

UNITED STATES PATENT OFFICE.

EDMOND G. DU MAZUEL, OF WASHINGTON, DISTRICT OF COLUMBIA.

MEANS FOR TRANSMITTING HIGH-PRESSURE FLUIDS.

1,330,310.   Specification of Letters Patent.   Patented Feb. 10, 1920.

Application filed May 6, 1919. Serial No. 295,235.

*To all whom it may concern:*

Be it known that I, EDMOND GUY FERDINAND ROBILLARD DU MAZUEL, a citizen of the United States, residing at Washington, in the District of Columbia, have invented new and useful Improvements in Means for Transmitting High-Pressure Fluids, of which the following is a specification.

My invention relates to improvements in passages, conduits and pipes, and more particularly to the above when adapted to convey fluids, gases or other matter under high pressure.

In order that a clear conception of my invention may be had, it may be stated briefly that in dealing with fluids, gases or other matter under high pressure, it is frequently necessary to transmit or convey such fluids, gases or other matter through long passages, conduits or pipes of a bore of very small cross section area sometimes: of a cross section area of less than .00019 square inch.

In constructing long passages, conduits and pipes for use under the above circumstances, it has been difficult, and generally impossible, to obtain the desired length of such passages, conduits and pipes of a sufficiently small bore to answer the requirements and it is, therefore, one of the objects of my present invention to build or construct passages, conduits and pipes of a bore of any desired cross section area and of any length.

A further object is to provide a simple and practical passage, conduit or pipe of the above character of exceedingly strong and durable construction as well as one which may be easily and inexpensively assembled.

Other objects will be in part obvious and in part hereinafter pointed out.

Attention is directed to the accompanying drawings wherein similar reference characters denote corresponding parts in the several views.

Figure 1:
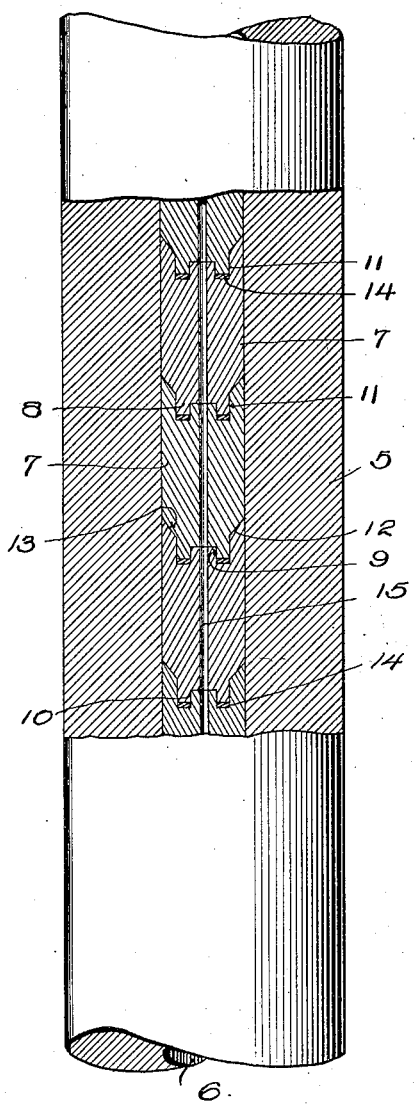
Figure 1 is a longitudinal partial sectional view of a pipe (5 Figs. 1 and 3) showing the various parts in assembled relation. This pipe (5 Figs. 1 and 3) might however be a block or mass, and an integral part of a machine or mechanical contrivance or other device.
Figure 2:
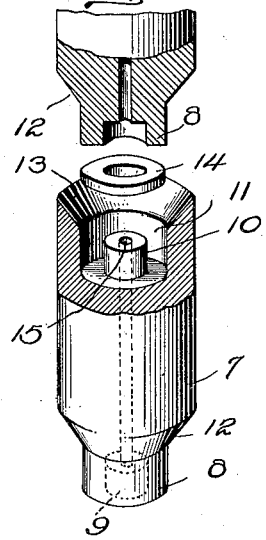
Fig. 2 is a detail perspective partial view of certain parts.
Figure 3:
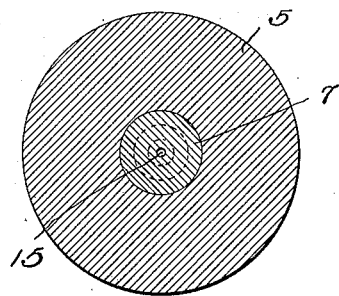
Fig. 3 is a transverse sectional view of the complete passage, conduit and, or, pipe.

Referring now to the drawings in detail, (5 Figs. 1 and 3) denotes a pipe, block or mass, or part of a machine, mechanical contrivance or other device, of any diameter or size and of any length through which a relatively large hole (6 Fig. 1) is bored. As the length of this pipe, block, mass, etc., increases, it may be necessary to increase the size of this hole (6 Fig. 1). Within this hole (6 Fig. 1) are positioned a plurality of inter-locking units (7 Figs. 1, 2 and 3) that furnish the passage, conduit or pipe (15 Figs. 1, 2 and 3). In Fig. 2 each unit comprises a body portion terminating in an annular boss (8 Figs. 1 and 2), having a concentric recess (9 Figs. 1 and 2) at one end adapted to receive an interleading or interlocking boss (10 Figs. 1 and 2) at the opposite end of an adjacent unit. This boss (10 Figs. 1 and 2) is surrounded by a recess (11 Figs. 1 and 2) adapted to receive the collar (8 Figs. 1 and 2). The opposite ends of each unit are beveled as at (12 and 13 Figs. 1 and 2) whereby when the units are assembled there will be a substantially tight fit. If desired, a washer (14 Figs. 1 and 2) may be interposed between the units. The units are adapted to have a "push" feed with the hole (6 Fig. 1).

From the above it will be seen that my invention provides a simple and practical passage, conduit or pipe of exceedingly strong and durable construction adapted to accomplish among other things all the objects and advantages herein set forth.

Although I have shown one style or design of simple passage conduit and pipe in the designs and specifications, yet I wish it understood that I do not restrict myself to any one style or design.

Having described my invention in annexed specifications, what I claim as new and desire to secure by Letters Patent, is:

1. A pipe for transmitting high pressure fluid, said pipe having a relatively minute bore formed in a plurality of alined members inserted in the pipe body.

2. A conduit for transmitting high pressure fluid, said conduit having a relatively minute bore formed in a plurality of alined members inserted in the conduit body.

3. A means for transmitting high pressure fluid, said means comprising a relatively minute bore formed in a plurality of alined members inserted in the body of said means.

4. A device having a means for transmitting high pressure fluid, the said means comprising a relatively minute bore formed in a plurality of alined members inserted in the body of said device.

E. G. DU MAZUEL.